United States Patent
Ouyang et al.

(10) Patent No.: US 11,025,729 B2
(45) Date of Patent: Jun. 1, 2021

(54) DATA ROUTE SELECTION METHOD AND APPARATUS

(71) Applicant: Huawei Technologies Co., Ltd., Shenzhen (CN)

(72) Inventors: Guowei Ouyang, Beijing (CN); Hui Jin, Beijing (CN); Xiaoyan Duan, Shenzhen (CN); Fenghui Dou, Beijing (CN); Haorui Yang, Shenzhen (CN); Xiaojuan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/991,205

(22) Filed: Aug. 12, 2020

(65) Prior Publication Data

US 2020/0382605 A1  Dec. 3, 2020

Related U.S. Application Data

(63) Continuation of application No. PCT/CN2019/074913, filed on Feb. 13, 2019.

(30) Foreign Application Priority Data

Feb. 13, 2018 (CN) .......................... 201810150966.1

(51) Int. Cl.
    *H04W 60/00* (2009.01)
    *H04L 29/08* (2006.01)
    *H04L 12/725* (2013.01)
    *H04W 40/20* (2009.01)

(52) U.S. Cl.
    CPC .......... *H04L 67/141* (2013.01); *H04L 45/306* (2013.01); *H04W 40/20* (2013.01)

(58) Field of Classification Search
CPC ..... H04L 67/141; H04L 45/306; H04W 40/20
See application file for complete search history.

(56) References Cited

U.S. PATENT DOCUMENTS

| 5,438,100 A | 8/1995 | Shinozaki et al. |
| 5,948,108 A | 9/1999 | Lu et al. |

(Continued)

FOREIGN PATENT DOCUMENTS

| CN | 1287576 C | 11/2006 |
| CN | 103813415 A | 5/2014 |

(Continued)

OTHER PUBLICATIONS

3GPP TS 23.501 V15.0.0, "3rd Generation Partnership Project; Technical Specification Group Services and System Aspects; System Architecture for the 5G System; Stage 2 (Release 15)," Dec. 2017, 181 pages.

(Continued)

*Primary Examiner* — Edan Orgad
*Assistant Examiner* — Malick A Sohrab
(74) *Attorney, Agent, or Firm* — Conley Rose, P.C.

(57) ABSTRACT

This application provides a data route selection method and apparatus, and relates to the field of communications technologies, so as to resolve a problem of an excessively long transmission delay for an application program that initiates a data transmission request relatively later. The data route selection method includes: detecting, by a terminal, that information about an application matches a traffic descriptor; determining, by the terminal, a first route selection components for the application; and routing, by the terminal, traffic of the application on a first protocol data unit PDU session. The first PDU session matches the first route selection components. This application is applicable to a terminal.

20 Claims, 2 Drawing Sheets

---

S201 — A terminal detects that an application matches a traffic descriptor

S202 — The terminal determines a first route selection component for the application corresponding to information about the application S203 — The terminal routes traffic of the application on a first PDU session

(56) References Cited

U.S. PATENT DOCUMENTS

| | | |
|---|---|---|
| 7,843,938 B1 | 11/2010 | Sutter et al. |
| 8,379,606 B2 | 2/2013 | Kim et al. |
| 2013/0215749 A1 | 8/2013 | Casey et al. |
| 2017/0163819 A1 | 6/2017 | Zhou et al. |
| 2017/0303259 A1* | 10/2017 | Lee ................. H04W 72/048 |
| 2018/0324577 A1* | 11/2018 | Faccin ................ H04W 8/06 |
| 2019/0007500 A1* | 1/2019 | Kim ................. H04L 67/141 |
| 2019/0053308 A1* | 2/2019 | Castellanos Zamora ................. H04L 65/1073 |
| 2019/0182788 A1* | 6/2019 | Lee ................. H04W 60/00 |
| 2020/0053562 A1* | 2/2020 | Kim ................. H04W 76/10 |
| 2020/0178196 A1* | 6/2020 | Wang ................. H04W 48/18 |

FOREIGN PATENT DOCUMENTS

| | | |
|---|---|---|
| CN | 103974383 A | 8/2014 |
| CN | 105101139 A | 11/2015 |
| CN | 106060900 A | 10/2016 |
| CN | 106412905 A | 2/2017 |
| KR | 20020053669 A | 7/2002 |
| RU | 2420042 C2 | 5/2011 |
| RU | 2530312 C2 | 10/2014 |

OTHER PUBLICATIONS

3GPP TS 23.503 V15.0.0, "3rd Generation Partnership Project; Technical Specification Group Services and System Aspects; Policy and Charging Control Framework for the 5G System; Stage 2 (Release 15)," Dec. 2017, 56 pages.

S2-178438, OPPO, "UE Route Selection Policy," SA WG2 Meeting #124, Nov. 27-Dec. 1, 2017, Reno, Nevada, USA, 9 pages.

S2-180669, Huawei, et al., "Clarification on editor's note related with LADN," 3GPP TSG-SA2 Meeting #125, Gothenburg, Sweden, Jan. 22-26, 4 pages.

\* cited by examiner

DATA ROUTE SELECTION METHOD AND APPARATUS

CROSS-REFERENCE TO RELATED APPLICATIONS

This application is continuation of International Application No. PCT/CN2019/074913, filed on Feb. 13, 2019, which claims priority to Chinese Patent Application No. 201810150966.1, filed on Feb. 13, 2018. The disclosures of the aforementioned applications are hereby incorporated by reference in their entireties.

TECHNICAL FIELD

This application relates to the field of communications technologies, and in particular, to a data route selection method and apparatus.

BACKGROUND

With the development of communications technologies, especially popularity of terminals, to match users' requirements for diverse functions, various application programs have emerged. Currently, for data transmission of an application program, a terminal may establish a PDU session to exchange data with a network side, so as to implement various functions of the application program. Considering that resources for data exchange between the network side and the terminal are limited in this data exchange process, to match a data transmission requirement of each application program, the network side may call an idle resource according to an order in which application programs request to perform data transmission, to implement data transmission processes of the application programs. In this way, for an application program that initiates a data transmission request relatively later, data transmission of the application program can be implemented only after an idle resource is allocated to the network side. In other words, for the application program that initiates a data transmission request relatively later, a data transmission delay is prolonged.

SUMMARY

Embodiments of this application provide a data route selection method and apparatus, so as to resolve a problem of an excessively long transmission delay for an application program that initiates a data transmission request relatively later.

To achieve the foregoing objective, the following technical solutions are used in the embodiments of this application:

According to a first aspect, an embodiment of this application provides a data route selection method. The method includes: After detecting that information about an application matches a traffic descriptor, a terminal may determine a first route selection components (RSC) for the application, so as to route traffic of the application on a first PDU session. The first PDU session matches the first route selection components. In this way, the traffic of the application can be transmitted on a reserved resource, to avoid that because a network side does not reserve a corresponding resource for each application, traffic of an application can be transmitted by calling an idle resource only after the idle resource exists.

In an example, the information of the application includes an Internet Protocol (IP) 3-tuple of the application or an identifier ID of the application. In this way, the terminal can determine, based on the IP 3-tuple of the application or the identifier of the application carried in the information of the application, whether the information of the application matches a traffic descriptor in a URSP rule corresponding to the application.

In an example, the first route selection components is a route selection components with a highest priority in route selection components that match a first condition. The first condition includes: Single network slice selection assistance information S-NSSAI in the first route selection components information belongs to allowed network slice selection assistance information allowed NSSAI; and/or when a data network name DNN in the first route selection components is a DNN of a local access data network LADN, the terminal is in a service area of the LADN. It can be learned that the terminal determines that a route selection components in the following cases is an invalid route selection components or an unavailable route selection components, to be specific, the route selection components that is set by the terminal as a route selection components not used in this selection process. Case 1: The route selection components includes at least one piece of S-NSSAI, and all S-NSSAI does not belong to the allowed NSSAI. The allowed NSSAI is S-NSSAI that may be used by the terminal to request a data service, and is provided by a network entity (for example, an AMF) for the terminal. Case 2: The route selection components includes a DNN, the DNN is a DNN of the LADN, and the terminal is not within the service area of the LADN. A valid route selection components or an available route selection components can be obtained from the URSP rule through filtering based on case 1 and case 2. Then, the terminal selects, as the first route selection components, a route selection components with a highest priority from the valid route selection components or the available route selection components obtained through filtering.

In an example, when there is no first PDU session that matches the first route selection components, the terminal establishes the first PDU session based on the first route selection components. It can be learned that there is no session that matches the first route selection components in an established PDU session. Therefore, to enable the terminal to route the traffic of the application on the first PDU session that matches the first route selection components, the terminal may establish a corresponding PDU session for the application, to be specific, the terminal may establish the first PDU session based on the first route selection components.

In an example, after the terminal establishes the PDU session based on the first route selection components, the terminal may receive a first message. The first message is used to indicate that establishing the first PDU session by the terminal is accepted. Therefore, that the terminal routes the traffic of the application on the first PDU session that matches the first route selection components may be implemented as: When a PDU session parameter carried in the first message matches the first route selection components, the terminal routes the traffic of the application on the first PDU session that matches the first route selection components.

In an example, the terminal establishes a second PDU session based on a second route selection components, and when establishing the second PDU session by the terminal is rejected, the terminal determines the first route selection components. Considering that a request of the terminal for establishing the second PDU session may be rejected by a network side, when the second PDU session cannot be successfully established by using the second route selection components, after determining the first route selection components, the terminal may use the first route selection components to route the traffic of the application on the first PDU session that matches the first route selection components. Likewise, when an established PDU session does not match the first route selection components, the terminal may establish the first PDU session based on the first route selection components. That means in this embodiment of this application, a process of selecting a route selection components is performed cyclically, until the terminal determines a PDU session on which the traffic of the application can be routed.

In an example, the terminal establishes a third PDU session based on a third route selection components, and then the terminal may receive a second message. The second message is used to indicate that establishing the third PDU session by the terminal is accepted. When a PDU session parameter carried in the second message does not match the third route selection components, the terminal determines the first route selection components. Considering that the third route selection components carried in a request that is for establishing the third PDU session and that is sent by the terminal to the network side is a requirement of the terminal for establishing a PDU session, but in a process of establishing the PDU session, the network side may not necessarily complete configuration fully in accordance with the requirement sent by the terminal, a PDU session parameter of the PDU session established by the network side may not match the third route selection components. After the terminal successfully establishes the third PDU session by using the third route selection components, when the third PDU session does not match the third route selection components, the terminal may determine the first route selection components.

In an example, that a PDU session parameter carried in the second message does not match the third route selection components may be implemented as: Continuity selection in the third route selection components is a continuity mode 1 (SSC mode 1), and a continuity mode in the PDU session parameter carried in the second message is a continuity mode other than the continuity mode 1, such as a continuity mode 2 (SSC mode 2) or a continuity mode 3 (SSC mode 3). In this embodiment of this application, selecting the SSC mode 1 means that during movement of the terminal, IP continuity in the SSC mode 1 is better than IP continuity in the SSC mode 2 and the SSC mode 3. In other words, compared with the SSC mode 2 and the SSC mode 3, a probability of IP interruption in the SSC mode 1 is lowest.

In an example, when a PDU session parameter carried in the first message does not match the first route selection components, the terminal may release an established PDU session, so as to prevent an unused PDU session from occupying excessive resources, and ensure full utilization of resources.

In an example, the first route selection components includes at least one parameter. That the first PDU session matches the first route selection components may be implemented as: When each parameter in the first route selection components is corresponding to one value, a parameter of the PDU session is the same as the first route selection components; or when at least one parameter in the first route selection components is corresponding to at least two values, a parameter of the PDU session belongs to the first route selection components.

In an example, when a second condition is satisfied, the terminal determines the first route selection components for the application corresponding to the information of the application. The second condition includes at least one of the following:

The application is enabled, which means: The terminal starts running the application corresponding to the information of the application. For the application that starts running, the terminal may determine a matching PDU session for the application, and then route the traffic of the application on the PDU session.

A PDU session on which the traffic of the application is routed is released, which means: An existing PDU session of the terminal is released. After the existing PDU session is released, the application corresponding to the traffic routed on the session needs to reselect a PDU session for data transmission. Therefore, the terminal can re-determine, for the traffic of the application, a PDU session that can be used for routing.

The terminal enters or leaves the service area of the LADN. A PDU session can be used only in some specific places (for example, in an LADN, a local access network), and therefore when the terminal leaves the service area of the LADN, this part of PDU session cannot continue being used. Therefore, the terminal can re-determine, for the traffic of the application, a PDU session that can be used for routing. Likewise, when the terminal enters the service area of the LADN, the terminal uses a PDU session corresponding to a DNN of the LADN in a current location. Therefore, the terminal can re-determine, for the traffic of the application, a PDU session that can be used for routing.

The terminal enters or leaves a non-3GPP coverage area, which includes: The terminal enters a non-3GPP converge area from a 3GPP converge area, and the terminal enters a 3GPP converge area from a non-3GPP converge area. The non-3GPP converge area means that the terminal is connected to a 5G core network through Wi-Fi.

A network standard of the terminal includes but is not limited to a 3G communications network, a 4G communications network, a 5G communications network, and the like. The network standard of the terminal changes, which means: A core network that serves the terminal changes from an evolved packet core network EPC to a 5th generation core network 5GC. For example, the terminal moves between a cell of the 4G communications network and a cell of the 5G communications network, and a mobility management entity of the terminal changes from an MME to an AMF. To be specific, the terminal changes from obtaining a data service from the EPC to obtaining a data service from the 5GC.

In addition, in an implementation, the second condition may further include that a registration area of the terminal changes. That a registration area of the terminal changes means: The terminal enters a new registration area from the original registration area. The registration area is a service area allocated to the terminal by a 5G core network element, to be specific, by an access and mobility management function AMF entity. After leaving the registration area, the terminal needs to re-initiate a registration process to the network side.

According to a second aspect, an embodiment of this application provides a PDU session routing method. The method includes: detecting, by a terminal, information that is about an application and that matches a traffic descriptor; determining, by the terminal, a first route selection components for the application corresponding to the information of the application; and routing, by the terminal, traffic of the application on a protocol data unit PDU session that matches the first route selection components.

In an example, the information of the application includes an Internet Protocol IP 3-tuple of the application or an identifier ID of the application.

In an example, the first route selection components is a route selection components with a highest priority in route selection components that match a preset condition, where the preset condition includes: Single network slice selection assistance information S-NSSAI in the route selection components information belongs to allowed network slice selection assistance information NSSAI; and/or when a data network name DNN in the route selection components information is a DNN of a local access data network LADN, the terminal is located in a service area of the LADN.

In an example, the method further includes: when there is no PDU session that matches the first route selection components, establishing, by the terminal, the PDU session based on the first route selection components.

In an example, the method further includes: when establishing the PDU session by the terminal is rejected, determining, by the terminal, a second route selection components, where the second route selection components is a route selection components with a highest priority in the route selection components that match the preset condition other than the first route selection components.

In an example, after the establishing, by the terminal, the PDU session based on the first route selection components, the method further includes: receiving, by the terminal, a first message, where the first message is used to indicate that establishing the PDU session by the terminal is accepted; and the routing, by the terminal, traffic of the application on a PDU session that matches the first route selection components includes: when a PDU session parameter carried in the first message matches the first route selection components, routing, by the terminal, the traffic of the application on the PDU session that matches the first route selection components.

In an example, when a PDU session parameter carried in the first message does not match the first route selection components, the method further includes: determining, by the terminal, a second route selection components, where the second route selection components is a route selection components with a highest priority in the route selection components that match the preset condition other than the first route selection components.

In an example, when a PDU session parameter carried in the first message does not match the first route selection components, the method further includes: releasing, by the terminal, an established PDU session.

In an example, timing of determining the first route selection components by the terminal includes at least one of the following: the terminal enables the application; a registration area of the terminal changes; the terminal enters or leaves a non-3rd Generation Partnership Project non-3GPP coverage area; and a network standard of the terminal changes.

In an example, the PDU session that matches the first route selection components includes: When each parameter in the first route selection components is corresponding to one value, a parameter of the PDU session is the same as the first route selection components; or when at least one parameter in the first route selection components is corresponding to at least two values, a parameter of the PDU session belongs to the first route selection components.

According to a third aspect, an embodiment of this application provides a data route selection apparatus. The apparatus can implement functions implemented in the foregoing method embodiments. The functions may be implemented by hardware or may be implemented by executing corresponding software by hardware. The hardware or software includes one or more modules corresponding to the foregoing functions.

According to a fourth aspect, an embodiment of this application provides a terminal. A structure of the terminal includes a display screen, a memory, one or more processors, a plurality of application programs, and one or more programs. The one or more programs are stored in the memory. When the one or more processors execute the one or more programs, the terminal is enabled to implement the method according to any one of the first aspect and the various examples of the first aspect.

According to a fifth aspect, an embodiment of this application provides a readable storage medium, including an instruction. When the instruction runs on a terminal, the terminal is enabled to perform the method according to any one of the first aspect and the various examples of the first aspect.

According to a sixth aspect, an embodiment of this application provides a computer program product. The computer program product includes software code, and the software code is used to perform the method according to any one of the first aspect and the various examples of the first aspect.

DESCRIPTION OF EMBODIMENTS

The following further describes in detail this application with reference to the accompanying drawings. A specific operation method in a method embodiment may also be applied to an apparatus embodiment or a system embodiment. It should be noted that, in this application, the word "exemplary" or "for example" is used to represent giving an example, an illustration, or a description. Any embodiment or design scheme described as "exemplary" or "for example" in this application should not be explained as being more preferred or having more advantages than another embodiment or design scheme. Exactly, use of the word "exemplary", "example", or the like is intended to present a related concept in a specific manner.

A system architecture and a service scenario described in this application are intended to describe the technical solutions of this application more clearly, and do not constitute any limitation to the technical solutions provided in this application. A person of ordinary skill in the art may know that, with evolution of a system architecture and emergence of a new service scenario, the technical solutions provided in this application are also applicable to similar technical problems. For example, this application may be applied to a 2nd Generation (2nd Generation, 2G) communications network, a 3rd Generation (3rd Generation, 3G) communications network, a 4th Generation (4th Generation, 4G) communications network, a 5th Generation (5th Generation, 5G) communications network, and a subsequent evolved network.

Figure 1:
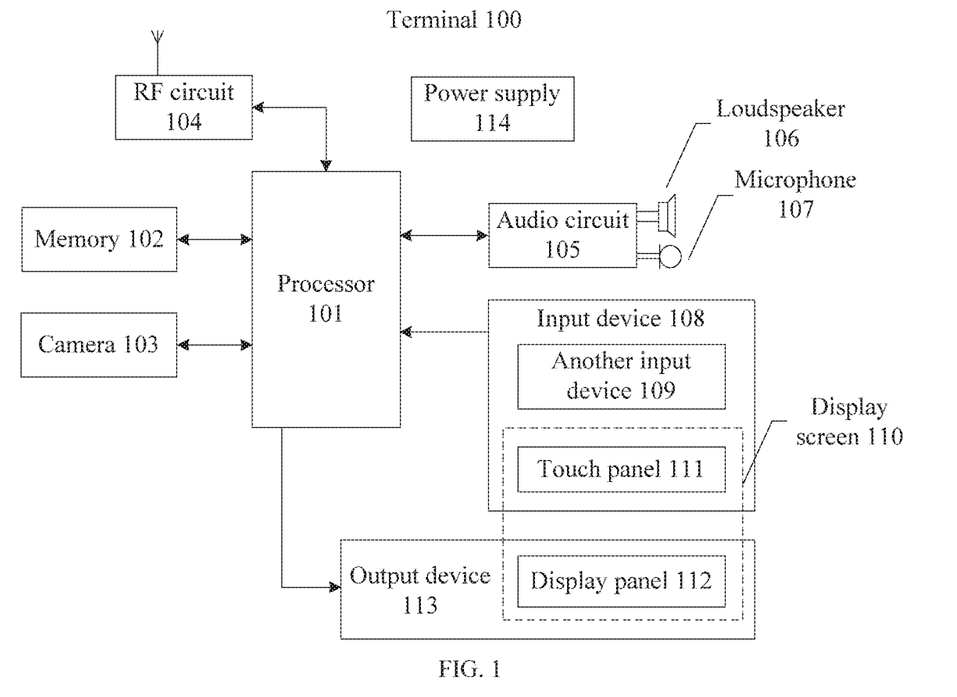
FIG. 1 is a schematic structural diagram of a first type of terminal according to an embodiment of this application.

An embodiment of this application may be used for a terminal. The terminal may include a laptop computer, a smartphone, a virtual reality (Virtual Reality, VR) device, an augmented reality (Augmented Reality, AR) device, an in-vehicle device, a smart wearable device, or other devices. The terminal may be provided with at least a display screen, an input device, and a processor. Using a terminal 100 as an example, as shown in FIG. 1, the terminal 100 includes components such as a processor 101, a memory 102, a camera 103, an RF circuit 104, an audio circuit 105, a loudspeaker 106, a microphone 107, an input device 108, another input device 109, a display screen 110, a touch panel 111, a display panel 112, an output device 113, and a power supply 114. The display screen 110 includes at least the touch panel 111 used as an input device and the display panel 112 used as an output device. It should be noted that the terminal structure shown in FIG. 1 does not constitute a limitation to the terminal, and the terminal may include more or fewer components than those shown in the figure, or some components may be combined, or some components may be split, or a different component configuration may be used. This is not limited herein.

The following describes the components of the terminal 100 in detail with reference to FIG. 1.

The radio frequency (Radio Frequency, RF) circuit 104 may be configured to send and receive signals during an information sending and receiving process or a call process. For example, if the terminal 100 is a mobile phone, after receiving, by using the RF circuit 104, downlink information sent by a base station, the terminal 100 may transmit, by using the RF circuit 104, the downlink information to the processor 101 for processing, and send related uplink data to the base station by using the RF circuit 104. Generally, the RF circuit includes but is not limited to an antenna, at least one amplifier, a transceiver, a coupler, a low noise amplifier (Low Noise Amplifier, LNA), a duplexer, and the like. In addition, the RF circuit 104 may also communicate with a network and another device through wireless communication. Any communication standard or protocol may be used for the wireless communication, including but not limited to Global System for Mobile Communications (Global System for Mobile Communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Messaging Service, SMS), and the like.

The memory 102 may be configured to store a software program and a module. The processor 101 runs the software program and the module that are stored in the memory 102, so as to execute various function applications and data processing of the terminal 100. The memory 102 may mainly include a program storage area and a data storage area. The program storage area may store an operating system, an application program required by at least one function (for example, a sound playback function and an image display function), and the like. The data storage area may store data (for example, audio data and video data) created based on use of the terminal 100, and the like. In addition, the memory 102 may include a high-speed random access memory, and may further include a non-volatile memory such as at least one magnetic disk storage device, a flash memory device, or another volatile solid-state storage device.

The another input device 109 may be configured to receive input digit or character information, and generate a key signal input related to user setting and function control of the terminal 100. Specifically, the another input device 109 may include but is not limited to one or more of a physical keyboard, a function key (such as a volume control key or an on/off key), a trackball, a mouse, a joystick, and an optical mouse (the optical mouse is a touch-sensitive surface that does not display a visual output, or an extension of a touch-sensitive surface formed by a touchscreen). Another input device 109 may further include a sensor built in the terminal 100, such as a gravity sensor or an acceleration sensor. The terminal 100 may further use a parameter detected by the sensor as input data.

The display screen 110 may be configured to display information entered by a user or information provided to a user and various menus of the terminal 100, and may also receive a user input. In addition, the display panel 112 may be configured in a form of a liquid crystal display (Liquid Crystal Display, LCD), an organic light-emitting diode (Organic Light-Emitting Diode, OLED), or the like. The touch panel 111, also referred to as a touchscreen, a touch-sensitive screen, or the like, may collect a touch operation or a non-touch operation performed by the user on or near the touch panel 111 (for example, an operation performed by the user on the touch panel 111 or near the touch panel 111 by using a finger, a stylus, or any other suitable object or accessory, or a somatosensory operation, where the operation includes operation types such as a single-point control operation and a multi-point control operation), and drive a corresponding connection apparatus according to a preset program. It should be noted that the touch panel 111 may further include two parts: a touch detection apparatus and a touch controller. The touch detection apparatus detects a touch position and a posture of the user, detects a signal generated by a touch operation, and transmits the signal to the touch controller. The touch controller receives touch information from the touch detection apparatus, converts the touch information into information that can be processed by the processor 101, and sends the information to the processor 101, and can receive a command sent by the processor 101 and execute the command. In addition, the touch panel 111 may be implemented in a plurality of types such as a resistive type, a capacitive type, an infrared type, and a surface acoustic wave type, or the touch panel 111 may be implemented by using any technology developed in the future. Generally, the touch panel 111 may cover the display panel 112. The user may perform, according to content displayed on the display panel 112 (the displayed content includes but is not limited to a soft keyboard, a virtual mouse, a virtual key, an icon, and the like), an operation on or near the touch panel 111 that covers the display panel 112. After detecting an operation performed on or near the touch panel 111, the touch panel 111 sends information about the operation to the processor 101 to determine a user input, and then the processor 101 provides a corresponding visual output on the display panel 112 based on the user input. In FIG. 1, the touch panel 111 and the display panel 112 are used as two independent components to implement input and output functions of the terminal 100. However, in some embodiments, the touch panel 111 and the display panel 112 may be integrated to implement the input and output functions of the terminal 100.

The RF circuit 104, the loudspeaker 106, and the microphone 107 may provide an audio interface between the user and the terminal 100. The audio circuit 105 may transmit, to the loudspeaker 106, a signal that is obtained by converting received audio data. The loudspeaker 106 converts the signal into a sound signal and outputs the sound signal. In addition, the microphone 107 may convert a collected sound signal into a signal. The audio circuit 105 receives the signal, converts the signal into audio data, and outputs the audio data to the RF circuit 104, to send the audio data to, for example, another terminal, or outputs the audio data to the memory 102, so that the processor 101 performs further processing based on content stored in the memory 102. In addition, the camera 103 may collect an image frame in real time and transmits the image frame to the processor 101 for processing, and store a result of processing into the memory 102 and/or present a result of processing to the user through the display panel 112.

The processor 101 is a control center of the terminal 100, and is connected to various parts of the entire terminal 100 by using various interfaces and lines, and performs various functions of the terminal 100 and processes data by running or executing the software program and/or the module stored in the memory 102 and invoking data stored in the memory 102, so as to perform overall monitoring on the terminal 100. It should be noted that the processor 101 may include one or more processing units. An application processor and a modem processor may further be integrated into the processor 101. The application processor mainly processes an operating system, a user interface (User Interface, UI), an application program, and the like. The modem processor mainly processes wireless communication. It can be understood that the modem processor may alternatively not be integrated into the processor 101.

The terminal 100 may further include the power supply 114 (for example, a battery) that supplies power to each component. In this embodiment of this application, the power supply 114 may be logically connected to the processor 101 by using a power supply management system, so that functions such as charging, discharging, and power consumption management are implemented by using the power supply management system.

In addition, FIG. 1 further includes a component not shown. For example, the terminal 100 may further include a Bluetooth module and the like, and details are not described herein.

In an embodiment of this application, a terminal may route traffic (traffic) of an application on an existing protocol data unit session (Protocol Data Unit Session, PDU Session) or on a newly established PDU session according to different rules defined in a UE route selection policy rule (UE Route Selection Policy information rule, URSP rule).

It can be learned that for an application, when the application matches a traffic descriptor (traffic descriptor) of a URSP rule of the terminal, the terminal may route traffic of the application on a corresponding PDU session based on route selection components (route selection components) recorded in a route selection descriptor (route selection descriptor) in the URSP rule.

The foregoing means there is one or multiple PDU session(s) have been established by terminal. When the parameters of one of the PDU Sessions in the terminal matches a selected route selection components, the terminal may associate the application with the PDU session. When none of the PDU session, which have been established in the terminal, matches a selected route selection components, the terminal establishes a new PDU session based on the selected route selection components. When the terminal establishes the new PUD Session, the terminal set value of parameters in the PDU Session request based on the selected route selection components, for example, single network slice selection assistance information (Single Network Slice Selection Assistance information, S-NSSAI), a session and service continuity mode (Session and Service Continuity Mode, SSC Mode) which is referred to as a continuity mode for short below, a data network name (Data Network Name, DNN), and a PDU type (PDU type), in order to request a network side to establish the PDU session, so as to support data service.

The following describes a data route selection process by using examples. The data route selection process includes but is not limited to a process in which a terminal selects a PDU session for the traffic of an application and routes the traffic of the application on the corresponding PDU session.

Figure 2:
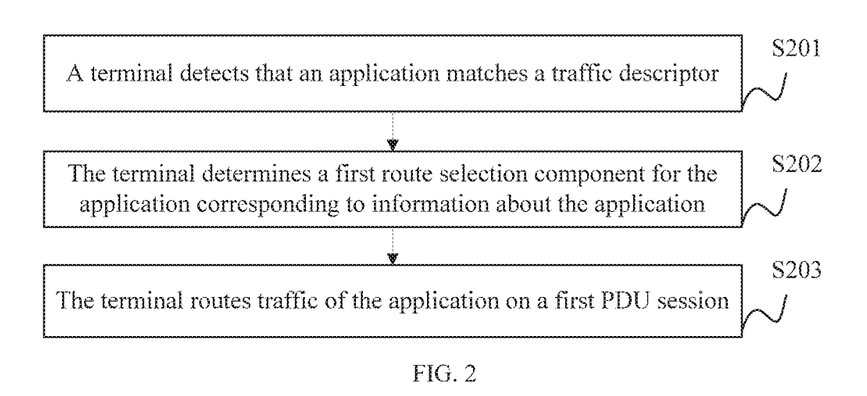
FIG. 2 is a flowchart of a data route selection method according to an embodiment of this application.

FIG. 2 is a flowchart of a data route selection method according to an embodiment of this application. A procedure of the method includes S201 to S203.

S201. A terminal detects that information about an application matches a traffic descriptor.

The traffic descriptor information can be stored in a URSP rule by the terminal locally. In this embodiment of this application, the terminal may locally store a URSP rule corresponding to each application in advance. That means one application maybe corresponds to one URSP rule shown in Table 1. Table 1 lists an example data structure of a URSP rule provided in an embodiment of this application.

TABLE 1

| Information name | Category | Packet control function (Packet Control Function, PCF) permitted to modify a terminal context | Scope |
| --- | --- | --- | --- |
| URSP rule precedence | Mandatory (Mandatory) | Yes | Terminal context |
| Traffic descriptor | | | |
| Route selection descriptor | Mandatory | | |

The URSP rule precedence (Rule Precedence) in Table 1 is used to determine the priority in which this URSP rule is executed in the terminal.

Table 2 lists an example data structure of a traffic descriptor provided in an embodiment of this application.

TABLE 2

| Information name | Category | PCF permitted to modify a terminal context | Scope |
| --- | --- | --- | --- |
| Application identifier | Optional (Optional) | | |
| Internet Protocol (Internet Protocol, IP) descriptor | Optional | Yes | Terminal context |
| Non-IP descriptor | Optional | Yes | Terminal context |

For an application, after the terminal activates the application, the application broadcasts/sends the application identifier (application identifiers, APP ID) listed in Table 2 to the terminal. When the application is running, data, which is sent by the application to a network side through the terminal, may carry the IP descriptor (IP descriptors) or the non-IP descriptor (non-IP descriptors) listed in Table 2.

Descriptions about the IP descriptor are similar to those about the non-IP descriptor. The IP descriptor is used as an example for description.

In this embodiment of this application, the IP descriptor can be an IP 3-tuple. The IP 3-tuple includes a destination IP address or a destination IPv6 network prefix, a destination port number, and an identifier of a protocol above IP, such as the Transmission Control Protocol (Transmission Control Protocol, TCP)/User Datagram Protocol (User Datagram Protocol, UDP), of a data packet that the application attempts to transmit to the network side.

It should be noted that in S201, the terminal detects that the information of the application matches the traffic descriptor. "Detect" means that an identifier of the application is the same as an application identifier in the traffic descriptor, or an IP address in traffic of the application is the same as an IP address in the traffic descriptor. Therefore, in this embodiment of this application, the information of the application may include an IP 3-tuple of the application or the identifier of the application. In this way, the terminal can determine, based on the IP 3-tuple of the application or the identifier of the application carried in the information of the application, whether the information of the application matches a traffic descriptor in a locally stored URSP rule corresponding to the application. Then, when the information of the application matches the traffic descriptor, the terminal can perform S202.

In Table 1, one URSP rule may include one or more route selection descriptors. In other words, one URSP rule includes at least one route selection descriptor. Using a route selection descriptor as an example. Table 3 lists an example data structure of a route selection descriptor provided in an embodiment of this application.

TABLE 3

| Information name | Category | PCF permitted to modify a terminal context | Scope |
|---|---|---|---|
| Route selection components | Mandatory | | |
| Continuity selection | Optional | Yes | Terminal context |
| Network slice selection | Optional | Yes | Terminal context |
| Data network name selection | Optional | Yes | Terminal context |
| Non-seamless offload indication | Optional | Yes | Terminal context |
| Access type preference | Optional | Yes | Terminal context |
| PDU type | Optional | Yes | Terminal context |

The route selection components in Table 3 includes information such as continuity selection (SSC mode selection), network slice selection (network slice selection), data network name selection (data network name selection, DNN selection), a non-seamless offload indication (non-seamless offload indication), an access type preference (access type preference), and a PDU type.

In this embodiment of this application, the continuity selection includes an SSC mode value or a list of SSC mode values. The SSC mode is a continuity mode. For example, an SSC mode 1, an SSC mode 2, and an SSC mode 3 are defined in a 5G communication system. In the SSC mode 1, it can be ensured that the IP address of a PDU session does not change within 5G network coverage. In the SSC mode 2, it can be ensured that within 50 network coverage, a new IP address is obtained for a PDU session after the PDU session is disconnected. In the SSC mode 3, it can be ensured that within 5G network coverage, a new IP address has been obtained for a PDU session before the PDU session is disconnected. In this embodiment of this application, selecting the SSC mode 1 means that during movement of the terminal, IP continuity in the SSC mode 1 is better than IP continuity in the SSC mode 2 and the SSC mode 3. In other words, compared with the SSC mode 2 and the SSC mode 3, the probability of IP interruption in the SSC mode 1 is lowest. The network slice selection includes an S-NSSAI value or a list of S-NSSAI values. The data network name selection includes a DNN value or a list of DNN values. The non-seamless offload indication is used to indicate that data needs to obtain data communication by using a non-3GPP access technology (for example, connecting to a public data network through public Wi-Fi). The access type preference includes one or two access type values. The access type includes 3GPP access and non-3GPP access. In the 5G communications network, 3GPP access refers to that the terminal performs access by using a Long Term Evolution (Long Term Evolution, LTE) air interface technology or a 50 air interface technology (Next Generation Radio Access Network, NG-RAN); and non-3GPP access refers to that the terminal performs access by using, for example, connecting to a 5G core network (non-3GPP AN connecting to a 5G core network) through Wi-Fi. The PDU type information includes one or more PDU types. The PDU type includes the IP, the IPv4, the IPv6, an Ethernet type (Ethernet type), an undefined type, an unstructured (unstructured) type, or the like.

S202. The terminal determines a first route selection components for the application, the information of which is considered matched.

In an implementation, when a second condition is satisfied, the terminal determines the first route selection components for the application, the information of which is considered matched. The second condition includes at least one of the following:

The application is enabled, which means: The terminal starts running the application, the information of the application is considered matched. After the application starts running, the terminal determines a corresponding PDU session for the application, and then route the traffic of the application on the PDU session.

A PDU session on which the traffic of the application is routed is released, which means: An existing PDU session of the terminal is released. After the existing PDU session is released, the application that is currently using the session needs to reselect a PDU session for data transmission. Therefore, the terminal can re-determine, for the traffic of the application, a PDU session that can be used for routing.

The terminal enters or leaves a service area of an LADN. A PDU session can be used only in some specific places (for example, in an LADN, a local access network), and therefore when the terminal leaves the service area of the LADN, PDU session(s) related to this LADN cannot continue being used. Therefore, the terminal can re-determine, for the traffic of the application, a PDU session that can be used for routing. Likewise, when the terminal enters the service area of the LADN, the terminal uses a PDU session corresponding to a DNN of the LADN in a current location. Therefore, the terminal can re-determine, for the traffic of the application, a PDU session that can be used for routing.

The terminal enters or leaves a non-3GPP coverage area, which includes: The terminal enters a non-3GPP converge area from a 3GPP converge area, and the terminal enters a 3GPP converge area from a non-3GPP converge area. The non-3GPP converge area means that the terminal is connected to a 5G core network through Wi-Fi.

A network standard of the terminal includes but is not limited to a 3G communication system, a 4G communication system, a 5G communication system, and the like. The network standard of the terminal changes, which means: A core network that serves the terminal changes from an evolved packet core network (Evolved Packet Core network, EPC) to a 5th generation core network (The 5th Generation Core Network, 5GC). For example, the terminal moves between a cell of the 4G communications network and a cell of the 5G communications network, and a mobility management entity of the terminal changes from an MME (Mobility Management Entity) to an AMF. To be specific, the terminal changes from obtaining a data service from the EPC to obtaining a data service from the 5GC.

In addition, in an implementation, the second condition can further include that a registration area (registration area) of the terminal changes. That a registration area of the terminal changes means: The terminal enters a new registration area from the original registration area. The registration area is a service area allocated to the terminal by an entity from 5G core network, to be specific, an access and mobility management function (Access and Mobility Management function, AMF) entity. After leaving the registration area, the terminal needs to re-initiate a registration process to the network side.

The first route selection components matches a first condition. The first condition includes at least one of the following:

S-NSSAI in the first route selection components information belongs to allowed network slice selection assistance information (Allowed Network Slice Selection Assistance information, Allowed NSSAI); and/or when a DNN in the route selection components information is a DNN of an LADN, the terminal is in a service area of the LADN.

In an implementation, the first route selection components is a route selection components with a highest priority in route selection components that match the first condition.

In this embodiment of this application, after determining the application corresponding to the information of the application, the terminal can locally determine the URSP rule corresponding to the application. Then, the terminal determines, in the URSP rule, a route selection components that matches the first condition, and determines the route selection components as the first route selection components. In this way, the terminal implements S202.

Considering that to determine the first route selection components, limitations of a condition and a priority between a list of route selection components need to be considered, this embodiment of this application provides the following implementations for determining the first route selection components.

In an implementation, the terminal can determine the first route selection components from a list of route selection components, by first-filtering then-selecting manner. After the terminal determines that there is information of the application matching the URSP rule, the terminal performs filtering on all route selection components in the URSP rule. The terminal determines that a route selection components in the following cases is an invalid route selection components or an unavailable/not usable route selection components, to be specific, the route selection components that is set by the terminal as a route selection components not used in this selection process. Case 1: The route selection components includes at least one S-NSSAI, and all S-NSSAI in this route selection components does not belong to the allowed NSSAI. The allowed NSSAI is S-NSSAI that may be used by the terminal to request a data service, and is provided by a network entity (for example, an AMF) for the terminal. Case 2: The route selection components includes a DNN, the DNN is a DNN of the LADN, and the terminal is not in the service area of the LADN. A valid route selection components or an available route selection components can be obtained from the URSP rule through filtering based on case 1 and case 2. Then, the terminal selects, as the first route selection components, a route selection components with a highest priority from the valid route selection components or the available route selection components obtained through filtering.

In another implementation, the terminal determines the first route selection components from a list of route selection components in a first-selecting then-filtering manner. After the terminal determines that there is information from the application matching the URSP rule, the terminal determines a route selection components with a highest priority in the URSP rule, and then performs filtering on the selected route selection components with the highest priority. A manner of performing filtering on the route selection components is similar to the filtering manner used in the foregoing implementation. To be specific, the terminal determines a route selection components that matches the foregoing case 1 and case 2 as an invalid route selection components or an unavailable/not usable route selection components. Reference may be made to the foregoing descriptions, and details are not described herein again. When the route selection components with the highest priority is determined by the terminal as a valid route selection components or an available/usable route selection components after filtering, the terminal determines the route selection components with the highest priority as the first route selection components. When the route selection components with the highest priority is determined by the terminal as an invalid route selection components or an not usable route selection components after filtering, the terminal can re-determine a route selection components with a highest priority from remaining list of route selection components in the URSP rule, to be specific, a route selection components with a highest priority in the current URSP rule except the previously determined route selection components with the highest priority, or in other words, a route selection components with a second highest priority in the current URSP rule. Then, the terminal performs filtering on the re-determined route selection components; and so on, until the terminal finds a route selection components that does not match the foregoing case 1 and case 2 in the URSP rule and determines the route selection components as the first route selection components.

It should be noted that both the foregoing first-filtering then-selecting implementation for the route selection components and the foregoing first-selecting then-filtering implementation for the route selection components by the terminal are implementations. This does not constitute a limitation to this embodiment of this application. That means the terminal can alternatively determine the first route selection components in another manner.

S203. The terminal routes traffic of the application on a first PDU session.

The first PDU session matches the first route selection components.

It should be noted that the first route selection components includes at least one parameter, and each parameter in the first route selection components contain either one single value or a list of values.

In an implementation, that the first PDU session matches the first route selection components may be implemented as follows:

When each parameter in the first route selection components contains only one value, the value of parameter of the PDU session is identical to the value of corresponding parameter in the first route selection components; or when at least one parameter in the first route selection components contains at least two values, a value of the parameter of the PDU session is included in the value of corresponding parameters of first route selection components.

It should be noted that, that each parameter contains only one value means: Each parameter in the first route selection components has only one value. For example, continuity selection contains only SSC mode 1. Likewise, that at least one parameter contains at least two values means: At least one parameter in the first route selection components has two or more values. For example, network slice selection contains S-NSSAI 1 and S-NSSAI 2.

For a parameter contains only one value, the parameter has the same value as a same type of parameter in the parameter of the PDU session. For a parameter contains at least two values, the parameter of the PDU session is included in the first route selection components. Take one parameter named network slice selection as example. When the parameter named network slice selection contains two values, the value of the parameter named network slice of the PDU session is the same as either of the foregoing two values. To be specific, a parameter which named network slice in the parameter of the PDU session is included in the parameter named network slice selection in the first route selection components.

It can be learned that after detecting the information of the application that matches the traffic descriptor, the terminal determines the first route selection components for the application, so as to/then route the traffic of the application on a PDU session that matches the first route selection components. In this way, the traffic of the application is transmitted in a customized network resource, to avoid a prior-art problem that because a network side does not reserve a corresponding resource for a specific application, traffic of the specific application has to wait until resource is available then is transmitted.

In an implementation, there is no session that matches the first route selection components in established PDU session(s)/. In order to enable the terminal to route the traffic of the application on the first PDU session that matches the first route selection components, the terminal establishes the corresponding PDU session for the application, to be specific, the terminal establishes the first PDU session based on the first route selection components.

To be specific, when sending, to the network side, a request to establish the PDU session, the terminal adds a request the value of the first route selection components. In this way, when receiving the request sent by the terminal, the network side selects a corresponding network resource based on the first route selection components, to establish a connection between the terminal and the network side. Then, the network side sends the parameters of corresponding PDU session to the terminal.

Considering that the request of the terminal to establish the PDU session may be rejected by the network side, to ensure that the terminal can select a suitable PDU session to route traffic of a specific application, when establishing a second PDU session by the terminal based on a second route selection components is rejected, the terminal determines the first route selection components. The first route selection components is a route selection components with a highest priority in route selection components that match the first condition.

It should be noted that for an implementation of determining the second route selection components, refer to the foregoing implementations of determining the first route selection components. To be specific, the terminal determines the second route selection components either in the first-filtering then-selecting manner or the first-selecting then-filtering manner.

It can be learned that when the second PDU session cannot be successfully established by using the second route selection components, after determining the first route selection components, based on the first route selection components, the terminal routes the traffic of the application on the first PDU session that matches the first route selection components.

Likewise, when establishing a third PDU session by the terminal based on a third route selection components is accepted, but the third PDU session does not match the third route selection components, the terminal determines the first route selection components and establish the first PDU session based on the first route selection components. For a process of establishing the first PDU session and the third PDU session, refer to the above-mentioned process of establishing the first PDU session based on the first route selection components. Details are not described herein again.

That means: Regardless of whether the terminal determines or establishes a PDU session based on the second route selection components or the third route selection components, because the terminal finally cannot obtain a suitable PDU session based on the second route selection components or the third route selection components, the terminal try one by one in the list route selection components based on in a priority order, until the terminal determines the first PDU session on which the traffic of the application can be routed.

That the network side sends the parameters of the established PDU session to the terminal may be implemented as follows:

The network side sends a second message to the terminal, and then the terminal receives the second message. The second message is used to indicate that the establishment of the third PDU session by the terminal is accepted. That means when the terminal receives the second message, it indicates that the third PDU session between the terminal and the network side has been established.

Likewise, the network side sends a first message to the terminal, and then the terminal receives the first message. The first message is used to indicate that establishing the first PDU session by the terminal is accepted. That means when the terminal receives the first message, it indicates that a PDU session between the terminal and the network side has been established.

The first PDU session is a PDU session that can be used, and the first PDU session is established based on the first route selection components sent by the terminal to the network side. Therefore, that the terminal routes the traffic of the application on the first PDU session that matches the first route selection components is be implemented as: When the parameters of the PDU session included in the first message matches the first route selection components, the terminal routes the traffic of the application on the first PDU session that matches the first route selection components.

It should be noted that a reason why the third PDU session is a PDU session that cannot be used is as follow: that the value of third route selection components included in a request to establish the third PDU session and sent by the terminal to the network side, is not exactly the same as parameters used in a process in which the network side establishes the third PDU session. That means the network side does not necessarily complete establishing the third PDU session based on a requirement sent by the terminal. Therefore, the parameters of the established third PDU session may not match the third route selection components.

For example, if continuity selection in the third route selection components is the SSC mode 1, and a continuity mode used for the third PDU session set the network is a continuity mode other than the SSC mode 1, for example, the SSC mode 2 or the SSC mode 3, the terminal further needs to determine the first route selection components.

In an implementation, to ensure that resources are fully utilized, when a PDU session parameter carried in the second message does not match the third route selection components, the terminal selectively releases the established third PDU session.

An embodiment of this application provides a data route selection method, including:

detecting, by a terminal, information that is about an application and that matches a traffic descriptor:

determining, by the terminal, a first route selection components for the application corresponding to the information of the application; and routing, by the terminal, traffic of the application on a PDU session that matches the first route selection components.

In an implementation, the information of the application includes an IP 3-tuple of the application or an identifier of the application.

In an implementation, the first route selection components is a route selection components with a highest priority in route selection components that match a condition.

The condition includes the following:

S-NSSAI in the route selection components information belongs to allowed network slice selection assistance information NSSAI; and/or when a DNN in the route selection components information is a DNN of an LADN, the terminal is within a service area of the LADN.

In an implementation, when there is no PDU session that matches the first route selection components, the terminal establishes the PDU session based on the first route selection components.

In an implementation, when establishing the PDU session by the terminal is rejected, the terminal determines a second route selection components, where the second route selection components is a route selection components with a highest priority in the route selection components that match the condition other than the first route selection components.

In an implementation, after the terminal establishes the PDU session based on the first route selection components, the terminal receives a first message, where the first message is used to indicate that establishing the PDU session by the terminal is accepted; and the terminal checks the established PDU session.

In an implementation, the routing, by the terminal, traffic of the application on a PDU session that matches the first route selection components includes:

when a PDU session parameter carried in the first message matches the first route selection components, the terminal routes the traffic of the application on the PDU session that matches the first route selection components.

In an implementation, when a PDU session parameter carried in the first message does not match the first route selection components, the terminal determines a second route selection components, where the second route selection components is a route selection components with a highest priority in the route selection components that match the condition other than the first route selection components.

In an implementation, when a PDU session parameter carried in the first message does not match the first route selection components, the terminal releases an established PDU session.

In an implementation, timing of determining the first route selection components by the terminal includes at least one of the following:

the terminal enables the application;

a registration area of the terminal changes; and the terminal enters or leaves a non-3GPP coverage area.

In an implementation, the PDU session that matches the first route selection components includes:

when each parameter in the first route selection components is corresponding to one value, a parameter of the PDU session is the same as the first route selection components; or when at least one parameter in the first route selection components is corresponding to at least two values, a parameter of the PDU session belongs to the first route selection components.

In an embodiment of this application, a data route selection apparatus may be divided into function modules according to the foregoing method embodiments. For example, function modules may be obtained through division based on corresponding functions, or two or more functions may be integrated into one processing module. The integrated module may be implemented in a form of hardware, or may be implemented in a form of a software functional module. It should be noted that, in this embodiment of this application, module division is an example, and is merely logical function division. In actual implementation, another division manner may be used.

Figure 3:
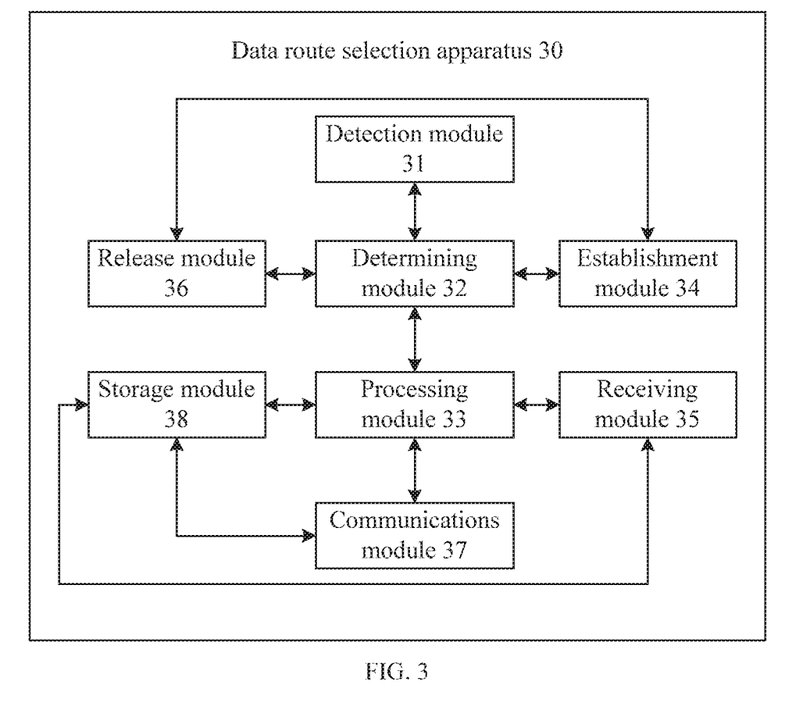
FIG. 3 is a schematic structural diagram of a data route selection apparatus according to an embodiment of this application.

FIG. 3 is an example schematic structural diagram of the data route selection apparatus in the foregoing embodiment. The data route selection apparatus 30 includes: a detection module 31, a determining module 32, a processing module 33, an establishment module 34, a receiving module 35, and a release module 36. The detection module 31 is configured to support the apparatus 30 in detecting whether information about an application in a terminal matches a traffic descriptor; or the like. The determining module 32 is configured to support the apparatus 30 in determining a first route selection components, a second route selection components, and a third route selection components; or the like. The processing module 33 is configured to support the apparatus 30 in routing traffic of the application on a corresponding PDU session, that is, a first PDU session corresponding to the first route selection components, and in performing another process of a technology described in this specification; or the like. The establishment module 34 is configured to support the apparatus 30 in establishing the first PDU session, a second PDU session, and a third PDU session; or the like. The receiving module 35 is configured to support the apparatus 30 in receiving a first message and a second message; or the like. The release module 36 is configured to support the apparatus 30 in releasing the established third PDU session. In this embodiment of this application, the apparatus 30 may further include a communications module 37 and a storage module 38. The communications module 37 is configured to support the apparatus 30 in performing data exchange with modules in the terminal, and/or support communication between the terminal and a device, for example, each device on a network side. The storage module 38 is configured to support the apparatus 30 in storing program code and data of the terminal.

The processing module 33 may be a processor or a controller, such as a CPU, a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The receiving module 72 may be implemented as a transceiver, a transceiver circuit, a communications interface, or the like. The storage module 75 may be implemented as a memory.

Figure 4:
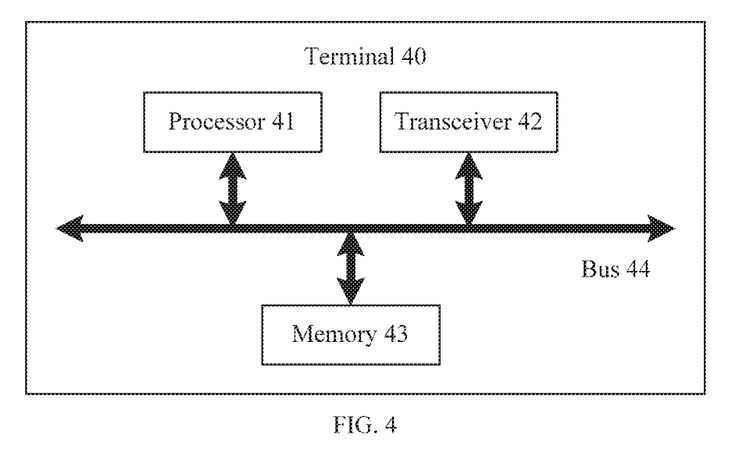
FIG. 4 is a schematic structural diagram of a second type of terminal according to an embodiment of this application.

If the detection module 31, the determining module 32, the processing module 33, the establishment module 34, and the release module 36 may be implemented as a processor, the receiving module 35 and the communications module 37 may be implemented as a transceiver, and the storage module 38 may be implemented as a memory, as shown in FIG. 4, a terminal 40 includes a processor 41, a transceiver 42, a memory 43, and a bus 44. The processor 41, the transceiver 42, and the memory 43 are connected to each other by using the bus 44. The bus 44 may be a peripheral component interconnect (Peripheral Component Interconnect, PCI) bus, an extended industry standard structure (Extended Industry Standard Architecture, EISA) bus, or the like. The bus may be classified into an address bus, a data bus, a control bus, and the like. For ease of representation, only one thick line is used to represent the bus in FIG. 4, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (Compact Disc Read-Only Memory, CD-ROM), or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be deployed in a same device, or the processor and the storage medium may be deployed in different devices as discrete components.

An embodiment of this application provides a readable storage medium, including an instruction. When the instruction runs on a terminal, the terminal is enabled to perform the foregoing method.

An embodiment of this application provides a computer program product. The computer program product includes software code. The software code is used to perform the foregoing method.

A person skilled in the art should be aware that in the foregoing one or more examples, functions described in this application may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made based on the technical solutions of this application shall fall within the protection scope of this application.

What is claimed is:

1. A data route selection method, comprising:
    determining a first route selection component (RSC) for an application when information about the application matches a traffic descriptor; and
    routing traffic of the application on a first protocol data unit (PDU) session, wherein the first PDU session matches the first RSC;
    wherein the traffic descriptor is contained in a user equipment (UE) route selection policy (URSP) rule, wherein the URSP rule comprises the first RSC, wherein the first RSC satisfies a first condition, and wherein the first condition comprises:
        a UE is in a service area of a local access data network (LADN) when the first RSC comprises a data network name (DNN) of the LADN; and
        at least one single network slice selection assistance information (S-NSSAI) belongs to allowed network slice selection assistance information (NSSAI) when the first RSC comprises the at least one.

2. The method according to claim 1, wherein the information of the application comprises an Internet Protocol (IP) 3-tuple of the application or an identifier (ID) of the application.

3. The method according to claim 1, further comprising establishing the first PDU session based on the first RSC when there is no existing PDU session that matches the first RSC in an established PDU session.

4. The method according to claim 1, wherein the URSP rule further comprises at least one route selection descriptor.

5. The method according to claim 1, wherein determining the first RSC for the application comprises determining, at least based on a priority of each RSC, the first RSC.

6. The method according to claim 1, wherein determining the first RSC for the application comprises determining the first RSC from at least one valid RSC, wherein the at least one valid RSC satisfies the first condition, and wherein the at least one valid RSC is recorded in at least one route selection descriptor.

7. The method according to claim 6, wherein determining the first RSC from the at least one valid RSC comprises determining, at least based on a priority of each valid RSC, the first RSC.

8. The method according to claim 7, wherein the at least one valid RSC comprises a second RSC and the first RSC, and wherein a priority of the second RSC is higher than a priority of the first RSC, and wherein determining the first RSC for the application comprises:
establishing a second PDU session based on a second RSC; and
determining, by a terminal, the first RSC when an establishment request of the second PDU session by the terminal is rejected.

9. The method according to claim 8, wherein a priority of the second RSC is higher than a priority of the first RSC.

10. The method according to claim 1, wherein the first RSC comprises at least one parameter, and wherein the first PDU session matches the first RSC when:
a first parameter in the first RSC contains only one value and a value of a first corresponding parameter of the first PDU session is identical to a value in the first RSC; or
a second parameter in the first RSC contains at least two values and a value of a second corresponding parameter of the first PDU session is identical to one of the at least two values.

11. The method according to claim 1, wherein determining the first RSC for the application comprises determining, by a terminal, the first RSC when a second condition is satisfied, and wherein the second condition comprises at least one of:
a PDU session on which the traffic of the application is routed is released;
the terminal enters or leaves the service area of the LADN;
the terminal enters or leaves a non-3rd Generation Partnership Project (non-3GPP) coverage area;
the terminal moves from an evolved packet core (EPC) network to a 5$^{th}$ Generation core (5GC) network; or
the terminal detects that the application is enabled.

12. The method according to claim 1, wherein determining the first RSC for the application comprises:
determining the URSP rule for the application, wherein the URSP rule contains one or more route selection descriptors; and
selecting a first route selection descriptor within the URSP rule, wherein the first route selection descriptor comprises the first RSC.

13. The method according to claim 1, wherein the RSC includes at least one of:
a session and service continuity (SSC) mode selection,
a network slice selection,
a data network name (DNN) selection,
a non-seamless offload indication,
an access type preference, or
a PDU type.

14. An apparatus, comprising:
a memory storing instructions; and
one or more processors coupled to the memory and configured to execute the instructions to cause the apparatus:
determine a first route selection component (RSC) for an application when information about the application matches a traffic descriptor; and
route traffic of the application on a first protocol data unit (PDU) session, wherein the first PDU session matches the first RSC, wherein the traffic descriptor is contained in a user equipment (UE) route selection policy (URSP) rule, wherein the URSP rule comprises the first RSC, wherein the first RSC satisfies a first condition, and wherein the first condition comprises:
an apparatus is in a service area of a local access data network (LADN) when the first RSC comprises a data network name (DNN) of the LADN; and
at least one single network slice selection assistance information (S-NSSAI) belongs to allowed network slice selection assistance information (NSSAI) when the first RSC comprises the at least one S-NSSAI.

15. The apparatus according to claim 14, wherein the URSP rule further comprises at least one route selection descriptor.

16. The apparatus according to claim 14, wherein the apparatus is configured to determine the first RSC for the application at least based on a priority of each RSC.

17. The apparatus according to claim 14, wherein the apparatus is a terminal configured to determine the first RSC for the application from at least one valid RSC, wherein the at least one valid RSC satisfies the first condition, and wherein the at least one valid RSC is recorded in at least one route selection descriptor.

18. The apparatus according to claim 17, wherein the at least one valid RSC comprises a second RSC and the first RSC, and wherein a priority of the second RSC is higher than a priority of the first RSC, wherein when determining the first RSC from the at least one valid RSC, the one or more processors execute the instructions to cause the terminal:
establish a second PDU session based on the second RSC; and
determine the first RSC when an establishment request of the second PDU session by the terminal is rejected.

19. The apparatus according to claim 14, wherein the apparatus is a terminal configured to determine the RSC for the application when a second condition is satisfied, wherein the second condition comprises at least one of:
the terminal detects that the application is enabled;
a PDU session on which the traffic of the application is routed is released;
the terminal enters or leaves the service area of the LADN;
the terminal enters or leaves a non-3rd Generation Partnership Project (non-3GPP) coverage area; or
the terminal moves from an evolved packer core (EPC) network to a 5$^{th}$ Generation core (5GC) network.

20. A non-transitory readable storage medium comprising a memory and one or more processors configured to execute instructions stored in the memory to implement a method comprising:
determining a first route selection component (RSC) for an application when information about the application matches a traffic descriptor; and
routing traffic of the application on a first protocol data unit (PDU) session, wherein the first PDU session matches the first RSC, wherein the traffic descriptor is contained in a user equipment (UE) route selection policy (URSP) rule, wherein the URSP rule comprises the first RSC, wherein the first RSC satisfies a first condition, and wherein the first condition comprises:
a UE is in a service area of a local access data network (LADN) when the first RSC comprises a data network name (DNN) of the LADN; and at least one single network slice selection assistance information (S-NSSAI) belongs to allowed network slice selection assistance information (NSSAI) when the first RSC comprises the at least one S-NSSAI.

* * * * *

UNITED STATES PATENT AND TRADEMARK OFFICE
CERTIFICATE OF CORRECTION

Page 1 of 1

PATENT NO. : 11,025,729 B2
APPLICATION NO. : 16/991205
DATED : June 1, 2021
INVENTOR(S) : Ouyang et al.

It is certified that error appears in the above-identified patent and that said Letters Patent is hereby corrected as shown below:

On the Title Page

Item (56), References Cited, U.S. Patent Documents: "5,438,100 A 8/1995 Shinozaki et al." should read "6,438,100 B1 8/2002 Halpern et al."

Item (56), References Cited, U.S. Patent Documents: "5,948,108 A 9/1999 Lu et al." should read "6,948,108 B1 9/2005 Ludwig et al."

In the Claims

Claim 1, Column 20, Line 48: "the at least one." should read "the at least one S-NSSAI."

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*